United States Patent
Uekawa

(10) Patent No.: US 7,123,462 B2
(45) Date of Patent: Oct. 17, 2006

(54) LOAD CONTROL DEVICE

(75) Inventor: Kazuya Uekawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 476 days.

(21) Appl. No.: 10/656,233

(22) Filed: Sep. 8, 2003

(65) Prior Publication Data
US 2004/0046516 A1   Mar. 11, 2004

(30) Foreign Application Priority Data
Sep. 9, 2002   (JP)   ............... 2002-262240

(51) Int. Cl.
*H02H 3/00*   (2006.01)
*H02P 1/54*   (2006.01)
(52) U.S. Cl. .................... 361/100; 318/98
(58) Field of Classification Search ........... 361/100, 361/91.7; 315/139; 318/98
See application file for complete search history.

(56) References Cited
U.S. PATENT DOCUMENTS

| | | | |
|---|---|---|---|
| 5,615,094 A * | 3/1997 | Cosentino et al. | 363/56.12 |
| 6,044,519 A * | 4/2000 | Hendrix | 15/319 |
| 6,326,733 B1 * | 12/2001 | Schweickardt, Jr. | 315/119 |
| 6,438,002 B1 * | 8/2002 | Alhoussami | 363/50 |
| 6,630,805 B1 * | 10/2003 | Makaran | 318/254 |
| 6,670,597 B1 * | 12/2003 | Kitamura et al. | 250/214 AL |

FOREIGN PATENT DOCUMENTS

JP   03-284121 A   12/1991

* cited by examiner

*Primary Examiner*—Stephen W. Jackson
*Assistant Examiner*—Boris Benenson
(74) *Attorney, Agent, or Firm*—Birch, Stewart, Kolasch & Birch, LLP

(57) ABSTRACT

A load control device having a power control element connected in series to a series circuit of a load and an alternating power supply and a snubber circuit comprises suppressing means for suppressing current flowing through the snubber circuit when the load is not in operation and for suppressing current flowing through the snubber circuit during a predetermined period which begins when the power control element shifts from an ON state to an OFF state.

17 Claims, 11 Drawing Sheets

LOAD CONTROL DEVICE

This nonprovisional application claims priority under 35 U.S.C. 119(a) on Patent Application No(s). 2002-262240 filed in JAPAN on Sep. 9, 2002, which is herein incorporated by reference.

BACKGROUND OF THE INVENTION

1. Field of the Invention

The present invention relates to a load control device utilizing a power control element such as a solid-state relay and a bi-directional gate-controlled triode thyristor. The present invention, particularly, relates to a load control device utilizing a snubber circuit connected to the power control element in parallel.

2. Description of the Prior Art

As an example of a conventional load control device using an alternating-current power supply and a power control element, a load control device utilizing a solid-state relay is described hereinafter. Here, the solid-state relay is a semiconductor contactless relay using a power semiconductor device such as a bi-directional gate-controlled triode thyristor and a reverse-blocking triode thyristor, each of which exhibits characteristics in that it remains in an ON state once the device is turned on, without a control signal to turn it on and off being fed, until current flowing through a switching portion thereof becomes zero.

FIG. 10 is a schematic circuit diagram showing a conventional load control device comprising a solid-state relay. In FIG. 10, reference numeral 1 indicates a solid-state relay, reference numeral 2 indicates a snubber circuit, reference numeral 3 indicates a load, all of which are connected to an alternating-current power supply 4 as illustrated. In this case, the load 3 and the solid-state relay 1 are connected in series to the alternating-current power supply 4 that supplies a power supply voltage Vf. On the other hand, the snubber circuit 2 is connected to the solid-state relay 1 in parallel. Here, the snubber circuit 2 is composed of a capacitor 21 and a resistor 22 connected in series.

The solid-state relay 1 shown in FIG. 10 is composed of a light-emitting element 11 (this usually being a gallium arsenide LED or a gallium aluminum arsenide LED) for converting electrical signals to light signals, a light-receiving element 12 (this usually being a bi-directional photo-gate-controlled triode thyristor that is brought into conduction when light hits the gate thereof) for converting light signals to electrical signals, and a power control element 13 (this usually being a bi-directional gate-controlled triode thyristor). Voltage measured across the power control element 13 is shown as Vs. When a control current I flows through the light-emitting element 11 and a current limiting resistor R1 connected thereto in series, then the light-emitting element 11 emits light; the light-receiving element 12 is brought into conduction; a trigger current flows into a gate of the power control element 13; and the power control element 13 is ignited. After these steps, a load current $I_L$ flows through the load 3 so that the load 3 functions.

The snubber circuit 2 connected in parallel with the power control element 13 is necessary for the following reasons. An example in which the load 3 is an inductive load to be regulated by phase control is described by referring to FIG. 11. FIG. 11 is a waveform schematic diagram showing functions of the conventional load control device. Shown from the top to the bottom in FIG. 11 are a waveform of the power supply voltage Vf of the alternating-current power supply 4, a waveform of the voltage Vs appearing across the power control element 13, a waveform of the load current $I_L$ of the load 3 flowing through the power control element 13, and a waveform of the control current I.

At time ta0 as shown in FIG. 11, the power control element 13 is ignited by a flow of the control current I as described above, which causes the load current $I_L$ to flow through the power control element 13. Although the power control element 13 is kept ignited while the load current $I_L$ is flowing therethrough, it is unable to remain ignited at time ta1 when the load current $I_L$ becomes zero. Because the load 3 is an inductive load, the phase of the load current $I_L$ delays from the phase of the power supply voltage Vf. As a result, because the power supply voltage Vf has already risen to voltage Va1 at time ta1, a voltage Vs having a steep rising edge is applied to the power control element 13. When a rate of voltage increase (dv/dt) exceeds a critical OFF voltage rising rate in commutation of the power control element 13, the power control element 13 may experience a commutation failure. In order to prevent this from happening, the snubber circuit 2 is used to moderate the rate of voltage increase. In other words, high-frequency components in the rising voltage should be removed.

The snubber circuit 2 is also required in order to protect the power control element 13 against a surge voltage. To be more specific, for example, if such an element as a transistor which can shut off a load current even when it is flowing by stopping inputting control signals, is used, it is possible, especially when the load is an inductive load, that a surge voltage exceeding a withstanding voltage of the power control element is generated across the power control element at the instant when the load current is shut off, and thereby destroying the element. Therefore, the snubber circuit is necessary also for suppressing such surge voltages, or in other words, for removing high-frequency components from such voltages.

The snubber circuit is also necessary, especially to an inductive load, for preventing the power control element 13 from being unable to remain ignited and turning off. The reasons are described hereinafter with reference to FIG. 12 and FIG. 13. FIG. 12 is a schematic circuit diagram showing a conventional load control device similar to the one shown in FIG. 10. In FIG. 12, such elements as are found also in FIG. 10 are identified with the same reference symbols and descriptions about the circuit are not repeated. A portion different from the load control device shown in FIG. 10 is that a bi-directional gate-controlled triode thyristor is used as a power control element instead of a solid-state relay.

In FIG. 12, reference numeral 121 represents a bi-directional gate-controlled triode thyristor. A load 3 and the bi-directional gate-controlled triode thyristor 121 are connected in series to an alternating-current power supply 4. A snubber circuit 2, on the other hand, is connected to the bi-directional gate-controlled triode thyristor 121 in parallel. Reference numeral 122 represents a controller connected externally for feeding a trigger current to a gate of the bi-directional gate-controlled triode thyristor 121. When the trigger current flows, the bi-directional gate-controlled triode thyristor 121 is ignited and a load current $I_L$ starts flowing through the load 3 causing the load 3 to start functioning. The bi-directional gate-controlled triode thyristor exhibits characteristics in that it remains ignited once it is turned on without current flowing through the gate thereof until current flowing through an output portion thereof becomes zero.

FIG. 13 is a waveform schematic diagram showing rising portions of currents flowing through major parts of the load control device shown in FIG. 12 immediately after the bi-directional gate-controlled triode thyristor 121 is ignited and when the load 3 is an inductive load. At time tb0 as shown in FIG. 13, a trigger current (not illustrated) flows into the gate of the bi-directional gate-controlled triode thyristor 121 and ignites it. In this case, a total current It flowing through the bi-directional gate-controlled triode thyristor 121 is a sum of the load current $I_L$ and a discharge current Is of the snubber circuit 2. Because the load 3 is an inductive load, the load current $I_L$ rises gradually.

Once the total current It flowing through the bi-directional gate-controlled triode thyristor 121 exceeds a latching current, the ignited bi-directional gate-controlled triode thyristor 121 remains ignited without having a flow of the trigger current. Here, assume that no snubber circuit 2 is provided. Then, the total current It flowing through the bi-directional gate-controlled triode thyristor 121 is made up of only the load current $I_L$. If the gate current is not present until time tb1 as shown in FIG. 13, the bi-directional gate-controlled triode thyristor 121 is unable to remain ignited and turned off (hereinafter, this phenomenon is called ignition failure), because a value of the load current $I_L$ does not exceeds a value of the latching current. In an actual case, there is provided the snubber circuit 2 and the total current It which is made up of the load current $I_L$ and the discharge current Is. As shown in FIG. 13, because the total current It has exceeded the latching current since the ignition timing (time tb0), the ignition failure never happens even if the gate current is stopped immediately after the ignition.

In recent years, with advancement in areas of energy savings, miniaturization, and high-performance of all equipments, there has been an increasing trend in number of lighter loads requiring a smaller load current. Accordingly, demands for achieving stable control of these lighter loads have been also increasing.

As mentioned above, If the snubber circuit 2 is connected to the power control element 12 in parallel as shown in FIG. 10 in order to remove the high-frequency components or prevent the ignition failure from occurring, when the power control element 13 is in OFF state, although the amount is small, current flows through a series circuit which is made up of the load 3 and the snubber circuit 2 and connected to the alternating-current power supply 4. This means that current flows through the load 3. Therefore, in conventional technologies, there has been a drawback in which a lighter load that may operate even with such a small current cannot be used as a load.

With regard to the conventional load control device shown in FIG. 10, as an example, given that the voltage of the alternating-current power supply 4 is 200V (rms), resistance of the resistor 22 and capacitance of the capacitor 21 are 22 ohms and 0.022 µF respectively as a snubber circuit constant, the current flowing through the load 3 via the snubber circuit 2 is in the range between 1 mA and 2 mA when the power control element 13 is off. With this amount of current, the load 3, if it is a light load, may fail to work properly. It is also possible that, although the load 3 may not be influenced with this amount of current, the load 3 may pose an unstable state or the like in which the load 3 malfunctions in an instant when the current increases even slightly due to fluctuations of the power supply voltage or the like.

In an attempt to cope with the lighter load, if the current flowing through the snubber circuit 2 is made smaller by increasing impedance thereof so that the lighter load can not malfunction, it is also possible that the aforementioned effects of the snubber circuit 2 become no longer available and a proper control of the load may not be achieved.

Furthermore, Japanese Patent Application Laid-Open No. H3-284121 discloses a switching circuit protective device that shows a method for preventing a load from malfunctioning by connecting a resistor in parallel to the load that is under control of a solid-state relay type switch having a snubber circuit in parallel. The resistor is intended to reduce a voltage generated across the load by current flowing through the snubber circuit and thereby prevent a malfunction of the load caused by that voltage. According to this method, however, a drawback is that the resistor allows unnecessary current to flow therethrough and consumes unnecessary power. Another drawback is that heat being generated by the resistor should be dealt with in designing such a device.

SUMMARY OF THE INVENTION

An object of the present invention is, in light of the drawbacks of the conventional technologies, to provide a load control device that prevents a load from malfunctioning caused by a small current flowing through a snubber circuit when a power control element is in an OFF state, thereby making it possible to achieve a stable control of the load.

To achieve the above object, according to the present invention, suppressing means is provided for suppressing current flowing through a snubber circuit when a load control is stopped. According to this configuration, it is possible to make current flowing through the load via the snubber circuit smaller than a minimum operating current of the load, and thereby prevent a light load sensitive to such a smaller current from malfunctioning. Furthermore, it is also possible to make voltage generated by the current flowing through the load and appearing across the load when the load is not in operation lower than a minimum operating voltage of the load, and thereby prevent the load from malfunctioning by such a lower voltage.

Alternatively, according to the present invention, suppressing means is provided for suppressing current flowing through the snubber circuit during a predetermined period immediately following an end of a predetermined delay time which begins when the power control element shifts from an ON state to an OFF state. In this configuration, it is possible, while maintaining effects of the snubber circuit for preventing the power control element from causing a commutation failure, to suppress the current flowing through the load via the snubber circuit and thereby prevent the load from malfunctioning when the load is not in operation.

According to another aspect of the present invention, as the suppressing means, a switch is provided and connected to the snubber circuit in series for interrupting the current flowing through the snubber circuit when the load is not in operation. In this configuration, it is possible to interrupt the current flowing through the load via the snubber circuit when the load is not in operation and thereby prevent the load from malfunctioning.

According to another aspect of the present invention, a mechanical relay is provided as the switch. In this configuration, it is possible to achieve a simple control for turning the switch on and off and provide a stable load control device prevented from malfunctioning by the current flowing through the snubber circuit, and achieve a reduction in production cost.

Alternatively, according to another aspect of the present invention, a solid-state relay is provided as the switch. In this configuration, it is possible to achieve stable on and off operations for a long period of time, because the solid-state relay is a contactless switch and therefore, has no make and break portions causing wear and tear. Also, the solid-state relay can achieve switching operations at a high speed because it has no mechanical portions as found in the mechanical relay. Furthermore, controlling the solid-state relay becomes easier because it can remain in conduction without control signals being applied thereto continuously. Moreover, the solid-state relay does not generate a surge because it turns off when current flowing a switching portion thereof becomes zero.

Alternatively, according to another aspect of the present invention, a photo-MOS transistor that is brought into conduction when light hits a gate thereof is provided as the switch. In this configuration, the photo-MOS transistor can achieve switching operations at a high speed, because it has no mechanical portions as found in the mechanical relay. Furthermore, effects of the snubber circuit when the load is in operation are not impaired and also heat generation is small, because an ON-resistance when the photo-MOS transistor is in conduction is low and the snubber circuit is connected through a low impedance path.

Alternatively, according to another aspect of the present invention, a bi-directional gate-controlled triode thyristor is provided as the switch. In this configuration it is possible to achieve stable on and off operations for a long period of time, because the bi-directional gate-controlled triode thyristor is a typical alternating-current switch and causes less wear and tear at a switching portion thereof. Also, the bi-directional gate-controlled triode thyristor can achieve switching operations at a high speed because it has no mechanical portions as found in the mechanical relay. Furthermore, controlling the bi-directional gate-controlled triode thyristor becomes easier because it can remain in conduction without control signals being applied thereto continuously. Moreover, the bi-directional gate-controlled triode thyristor does not generate a surge because it turns off when current flowing the switching portion thereof becomes zero.

Furthermore, according to another aspect of the present invention, a delay circuit for causing a signal for turning off the switch to delay from a signal for turning off the power control element is provided. In this configuration, it is possible to produce a timing at which the switch is turned off from the signal for turning off the power control element and thereby eliminate a need for an additional controller for controlling on and off switching timings of the switch. Thus, it is possible to produce a stable load control device prevented from malfunctioning caused by the current flowing through the snubber circuit and achieve a reduction in production cost also. It is to be noted that, the above-mentioned configuration added with a delay circuit can be also achieved by using such a component as a mechanical relay, a solid-state relay, a photo-MOS transistor, or a bi-directional gate-controlled triode thyristor in lieu of the above-mentioned switch.

Furthermore, according to another aspect of the present invention, a thermistor having a negative temperature coefficient is provided to form a snubber circuit. In this configuration, it is possible to suppress the current flowing through the snubber circuit without using another controller and thereby easily produce a load control device free from malfunction caused by the current flowing through the snubber circuit, and achieve a reduction in production cost also. More specifically, if the thermistor is arranged in a position affected by a temperature change in accordance with operations of the load, it is possible to reduce current flowing through the snubber circuit to such an amount small enough to prevent such a light load sensitive to a small current from malfunctioning, because the temperature of the thermistor becomes lower and a resistance value thereof increases when the load is not in operation. On the other hand, when the load is in operation, the resistance of the thermistor decreases due to a rise in temperature of the thermistor. In other words, because an impedance of the snubber circuit becomes smaller, high-frequency component removal efficiency during Furthermore, according to another aspect of the present invention, it is possible to provide the aforementioned thermistor in close proximity to the power control element. In this configuration, it is possible to reliably achieve suppressing the current flowing through the snubber circuit formed by the aforementioned thermistor, because the power control element having a flow of the load current therethrough changes temperature thereof in accordance with the load operational status. Furthermore, components forming the snubber circuit and the power control element can be combined into one piece. By doing so, it is possible to reduce a number of components forming the load control device free from malfunction caused by the current flowing through the snubber circuit and thereby reduce the cost.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 10:
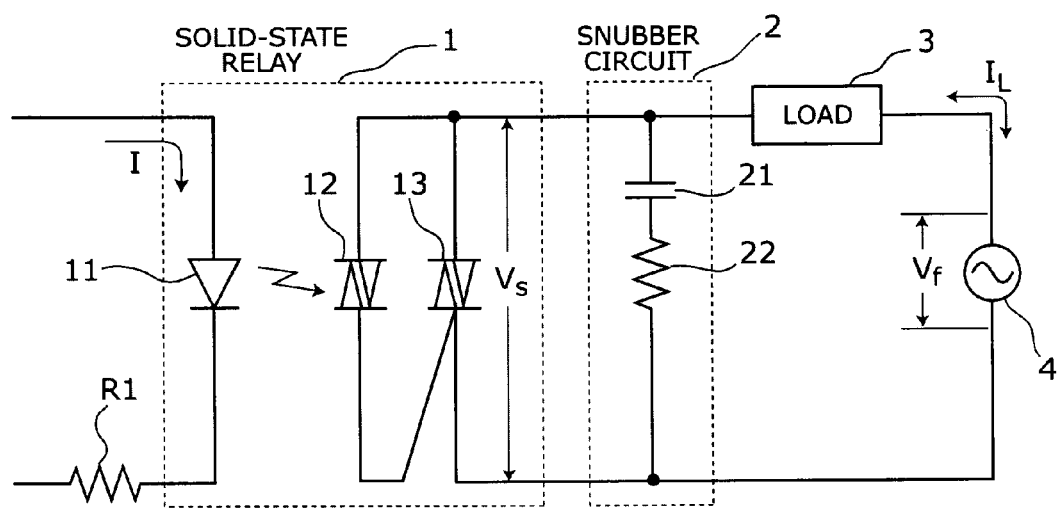
FIG. 10 is a schematic circuit diagram showing a conventional load control device comprising a solid-state relay.
Figure 11:
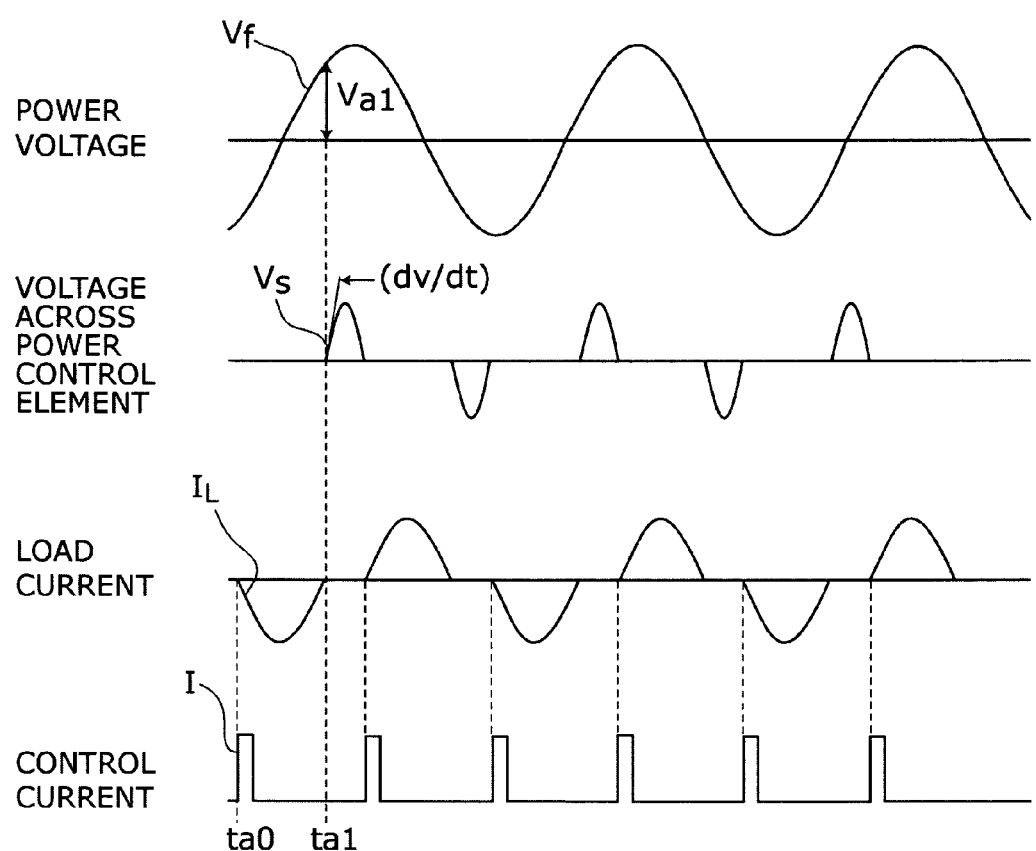
FIG. 11 is a waveform schematic diagram showing functions of the conventional load control device.
Figure 12:
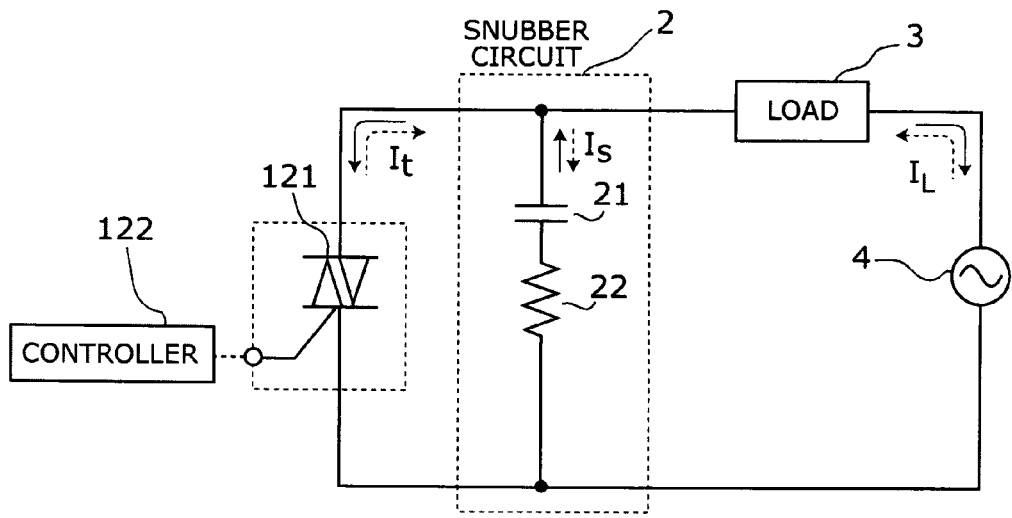
FIG. 12 is a schematic circuit diagram showing a conventional load control device similar to the one shown in FIG. 10.
Figure 13:
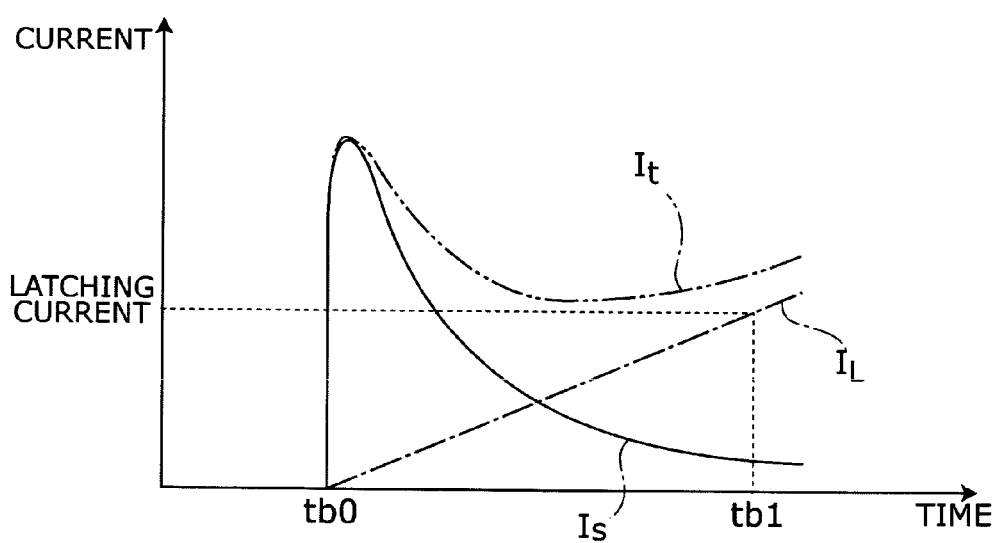
FIG. 13 is a waveform schematic diagram showing rising portions of currents flowing through major parts of the load control device shown in FIG. 12.

Hereinafter, embodiments of the present invention will be described with reference to the accompanying drawings. For convenience's sake, such components as are found also in the conventional example shown in FIG. 10 are identified with the same reference numerals.

Figure 1:
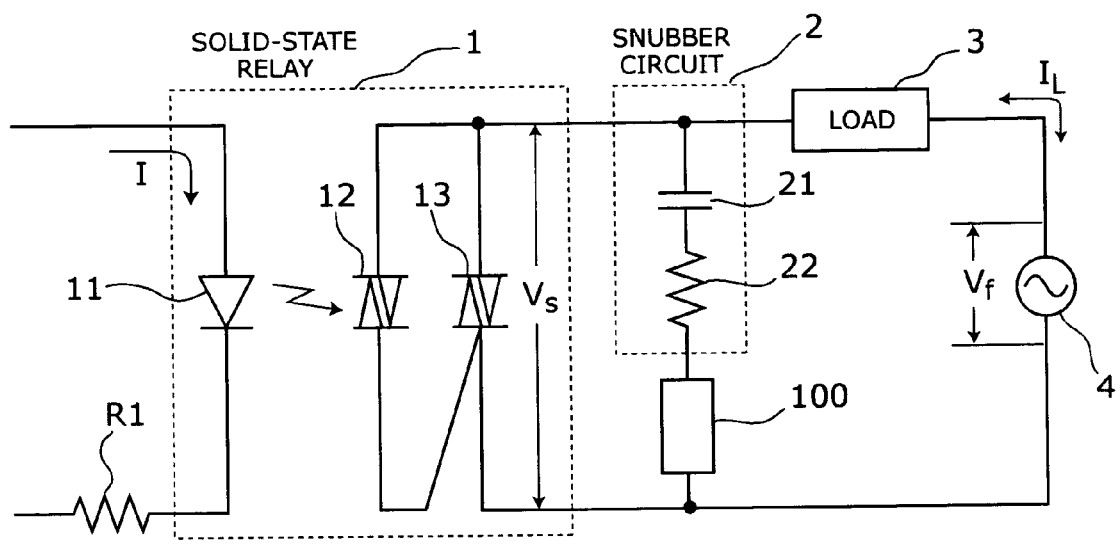
FIG. 1 is a circuit diagram of a load control device embodying the invention.

FIG. 1 is a circuit diagram of a load control device embodying the invention. Here, reference numeral 1 represents a solid-state relay, reference numeral 2 represents a snubber circuit, reference numeral 3 represents a load, reference numeral 4 represents an alternating-current power supply, and reference numeral 100 represents a switch. Portions different from the load control device shown in FIG. 10 are that the switch 100 is connected to the snubber circuit 2 in series and that a series circuit made up of the snubber circuit 2 and the switch 100 is connected to the solid-state relay 1 in parallel. It is also to be noted that Vf represents a power supply voltage of the alternating-current power supply 4, $I_L$ represents a load current flowing through the load 3, Vs represents a voltage appearing across the solid-state relay 1, and I represents current flowing through a light-emitting element 11.

Figure 2:
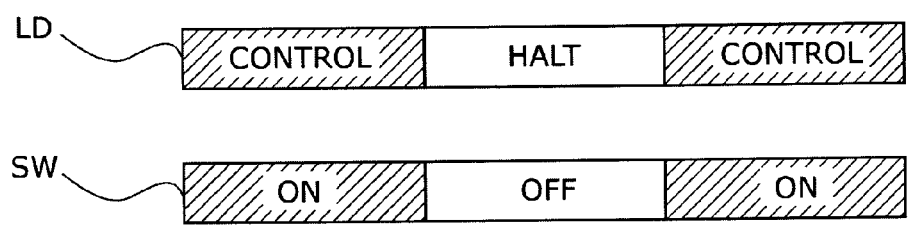
FIG. 2 is a status diagram showing a load control status of the load control device embodying the invention.

Next, an ON-OFF operation of the switch 100 is described. FIG. 2 is a status diagram showing a load control status of the load control device embodying the invention. A status block LD shows a state of the load 3. A portion with "CONTROL" on a hatch pattern shows a control state when the control is performed and a portion with "HALT" on a white background shows a halt state when the control is in halt. A status block SW shows an ON or OFF state of the switch 100. A portion with "ON" on a hatch pattern shows an ON state and a portion with "OFF" on a white background shows an OFF state. The switch 100 is in the ON state during the control state and in the OFF state during the halt state.

Here, the "control state" of the load means a state when the load is in use, while the "halt state" of the load means a state when the load is not in use. This will be described hereinafter in details for each type of different power controls. When the power of the load 3 of the load control device as shown in FIG. 1 is controlled by an ON-OFF control method, a state in which the power control element 13 is ON is the control state. Also, when the power is controlled by a phase control method, the control state includes an OFF period of the power control element 13 determined by a phase-control angle in addition to the ON state of the power control element 13. However, when the OFF period lasts an entire cycle, then it is the halt state rather than the control state. In either control method, the control state includes a period in which, as described before, the snubber circuit 2 becomes effective in preventing the power control element 13 from causing a commutation failure in a period immediately after the power control element 13 turns off when the load control is stopped in order to stop using the load. Other periods than the control state explained above are included in the halt state.

When the load control is in the halt state, turning the switch 100 off means that it interrupts current flowing through the snubber circuit 2 when the power control element 13 is off. By this action, it is possible to prevent the load 3 from malfunctioning even if the load 3 is a light load sensitive to a small current. It is also possible to prevent the load 3 from malfunctioning even if the load 3 is a voltage-sensitive load, because current flowing through the load 3 via the snubber circuit 2 becomes absent and a voltage applied to the load 3 drops.

Simultaneously with the load control shifting from the halt state to the control state, the switch 100 turns from off to on. This is necessary for performing a stable load control by making the snubber circuit 2 effective. Although it is not necessary to turn on the switch 100 in synchronization with the load control being shifted from the halt state to the control state, it is necessary to turn on the switch 100 before the power control element 13 already in the control state turns from on to off for the first time. This is for preventing the commutation failure. However, it may be possible to prevent the ignition failure from happening depending on control conditions, which is one of the effects of the snubber circuit 2 as mentioned earlier, if the switch 100 is already on when the power control element 13 turns on. It is desirable, however, to turn on the switch 100 at the same time the power control element 13 turns on, because the load 3 may malfunction if the switch 100 has been turned on before the power control element 13 turns on.

It is also possible to turn the switch 100 on and off manually or automatically, or it is possible to do this semi-automatically, such as performing one of the on operation and the off operation manually and another of the on operation and the off operation automatically. The timing and duration of on and off automatic operations can be determined in accordance with conditions such as circuit conditions and load control conditions (phase control or full-wave ON-OFF control). If the switch 100 is turned on and off manually, it is possible to use manually operable switches such as a push button switch or a toggle switch as the switch 100. A combination of multiple switches can also be used as the switch 100.

As described above, it is possible to prevent the load 3 from malfunctioning by turning the switch 100 off when the load control is not performed on the load 3. On the other hand, it is possible to achieve a stable load control by turning the switch 100 on when the load is controlled, because the snubber circuit 2 is connected to the power control element 13 in parallel, thereby enabling the effects of the snubber circuit 2 as explained above.

Figure 3:
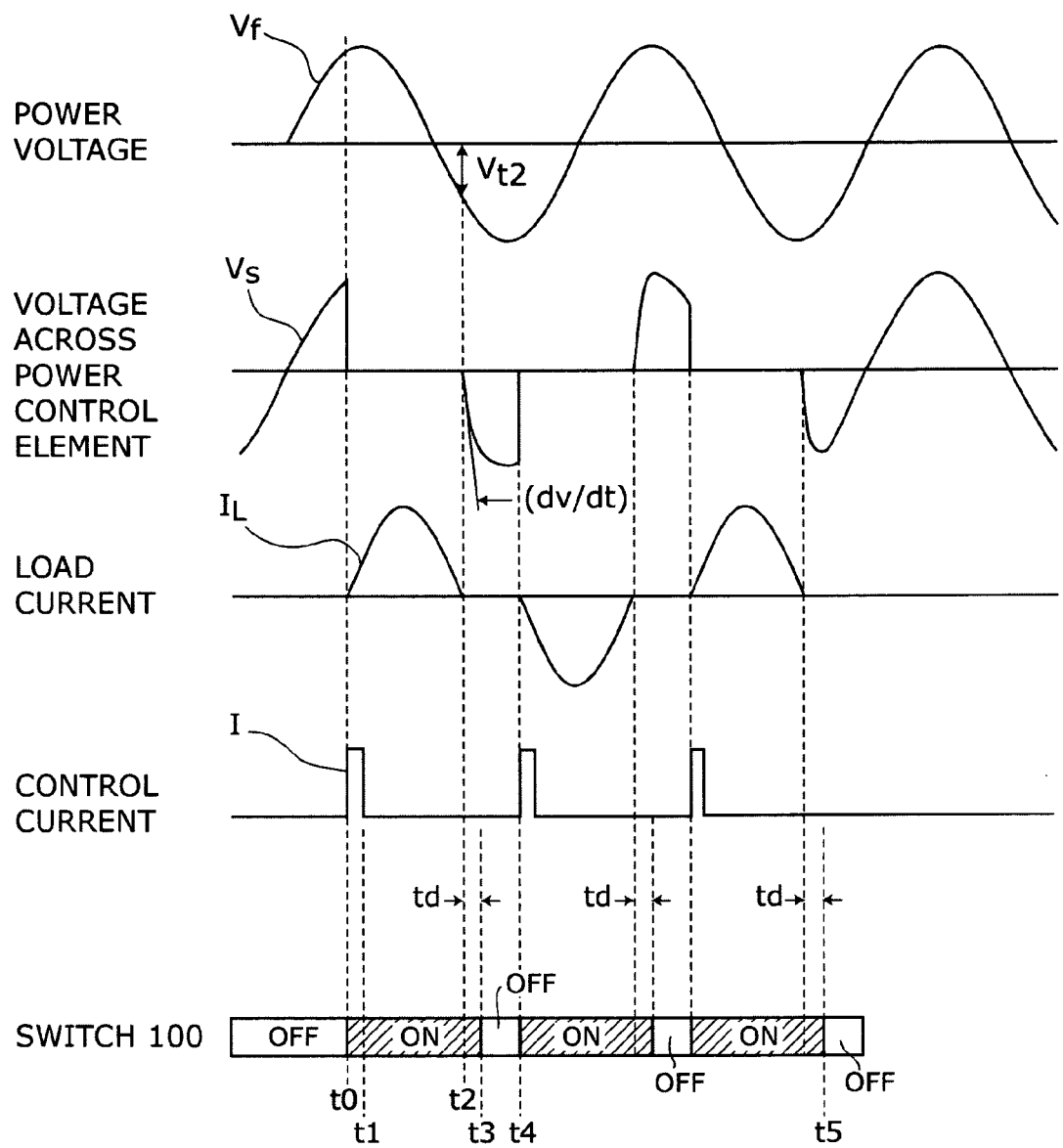
FIG. 3 is a waveform diagram showing operations of the load control device shown in FIG. 1.

Next, detailed operations of the switch 100 of the load control device shown in FIG. 1 are described when the load 3 is controlled by the phase control method and the switch 100 is operated during the phase control. It is assumed that the load 3 shown in FIG. 1 is an inductive load. An example of the inductive load that is phase controlled is described hereunder with reference to FIG. 3. FIG. 3 is a waveform diagram showing operations of the load control device shown in FIG. 1. Shown from the top to the bottom in FIG. 3 are a waveform of the power supply voltage Vf, a waveform of the voltage Vs appearing across the power control element 13, a waveform of the current flowing through the power control element 13, namely the load current $I_L$, a waveform of the control current I, and ON-OFF states of the switch 100.

Until time t0 as shown in FIG. 3, the power control element 13 has been in an OFF state, thus no load current $I_L$ has flown. At this time, the waveform of the voltage Vs appearing across the power control device 13 is similar to the waveform of the power supply voltage Vf, and the voltage Vs is a divided voltage obtained by dividing the power supply voltage Vf in accordance with the proportion of an impedance of the snubber circuit 2 and an impedance of the load 3. At this time, the switch 100 is off. When the switch 100 is off, one end of the snubber circuit 2 is open.

This does not form a circuit allowing current to flow through the load 3, thereby preventing the load 3 from malfunctioning regardless of types of the load. Furthermore, because the snubber circuit 2 becomes a high-impedance circuit, the voltage appearing across the load 3 becomes small, and thus it becomes possible to prevent such a voltage-sensitive load from malfunctioning.

Next, at time t0 as shown in FIG. 3, when the control current I flows through the solid-state relay 1, the power control element 13 is ignited and the voltage Vs across the power control element 13 becomes 0V. At the same time, the load current $I_L$ starts flowing through the load 3, and thus the load 3 starts functioning. The switch 100, on the other hand, is controlled to turn on simultaneously with the control current I starting to flow. Although the switch 100 can be turned on not in synchronization with the start of the control current I, it should be turned on at least before the already-ignited power control element 13 turns off. This is to avoid the commutation failure. Furthermore, it is also possible to turn on the switch 100 simultaneously with or prior to the start of the control current I. As explained before with respect to the effects of the snubber circuit 2, if the snubber circuit 2 is enabled when the power control element 13 is ignited, it provides the effect of preventing the power control element 13 from failing to ignite depending on the control conditions. However, it is desirable to turn on the switch 100 simultaneously with the start of the control current I, because the load 3 may malfunction if the switch 100 is turned on earlier.

Next, at time t1, the control current I becomes zero. However, the power control element 13 remains ignited during the period between time t0 and time t2, because the power control element 13, once it has been ignited, does not turn off until the load current $I_L$ becomes zero, even if the control current I becomes absent.

Next, at time t2, the load current $I_L$ becomes zero, the load 3 stops functioning, and the power control element 13 turns off. The switch 100 is so controlled as to remain in the ON state for a duration starting from time t2 through a predetermined period td that can be set. The reason for this will be described hereunder. At time t2, the power supply voltage Vf has already risen to a voltage Vt2 as shown in FIG. 3, because the load 3 is an inductive load and the phase of voltage leads the phase of current. Then, the moment at which the load current $I_L$ becomes zero, this voltage Vt2 is applied across the power control element 13. At this instant, if the rate of voltage increase (dv/dt) in the voltage Vs appearing across the power control element 13 exceeds a critical OFF voltage rising rate in commutation thereof, the power control element 13 may be ignited despite an absence of a gate current. However, at time t2, because the switch 100 remains in the ON state, the snubber circuit 2 moderates the rate of voltage increase (dv/dt) in the voltage appearing across the power control element 13 as shown in FIG. 3. In other words, high-frequency components are removed and the commutation failure is prevented. Because of this, it is necessary, taking circuit conditions, control conditions, or the like into consideration, to set the predetermined period td long enough to remove the high-frequency components.

Thereafter, at time t3, the switch 100 shifts to the OFF state. A switching time at which the switch 100 shifts from the ON state to the OFF state may be controlled in such a way that the switch 100 is turned off after the predetermined period td that is any given adjustable time counted from the moment that the power control element 13 is turned off, or may be controlled in a different manner. For example, it is possible to provide a detector that detects the rate of voltage increase across the power control element 13 and use such a control method to turn the switch 100 from on to off when the detected rate of voltage increase becomes smaller than a predetermined value. It is also possible to relate the control of the switch 100 to the control current I and turn the switch 100 from on to off a predetermined period after the control current I stopped.

Next, at time t4, when the control current starts flowing again, the power control element 13 is ignited again and the load current $I_L$ as shown in FIG. 3 starts flowing. Simultaneously, the switch 100 is shifted into the ON state again in order to make the snubber circuit 2 effective. Thereafter, identical operations as shown between time t0 and time t3 will be repeated every time the control current I flows. After the switch 100 is shifted from the ON state to the OFF state at time t5, the switch 100 will remain in the OFF state, because the control current I will not flow.

As described above, by turning the switch 100 off when the power control element 13 is off, it is possible to prevent the load 3 from malfunctioning and thereby achieve an accurate phase control even during the phase control is being performed.

Figure 4:
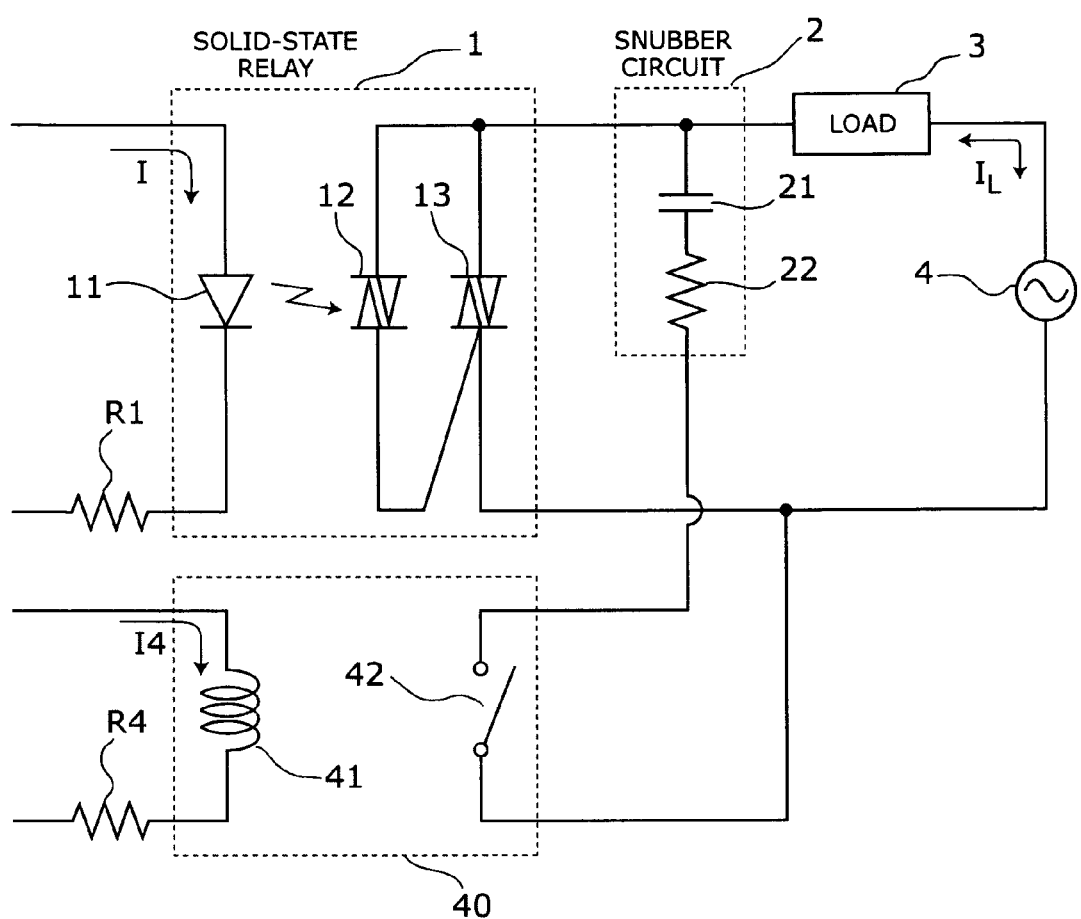
FIG. 4 a circuit diagram embodying the invention and showing a mechanical relay used as the switch 100 shown in FIG. 1.

FIG. 4 is a circuit diagram embodying the invention and showing a mechanical relay used as the switch 100 shown in FIG. 1. In FIG. 4, reference numeral 40 represents a mechanical relay having inside a mechanical contact 42 and a coil 41 for driving the contact 42. The coil 41 is connected to a current limiting resistor 4 in series and can open or close the mechanical contact 42 by a presence or absence of a control current I4 flowing therethrough. It is possible to configure the circuit in such a way that, when the control current I4 flows through the coil 41, the contact 42 closes or, conversely, the contact 42 opens. The mechanical contact 42, as a switch to open and close the snubber circuit 2, is connected thereto in series and a series circuit made up of the snubber circuit 2 and the mechanical contact 42 is connected to the power control element 13 in parallel. When the mechanical contact 42 is closed, the snubber circuit 2 becomes effective. When the mechanical contact 42 is open, current flowing the snubber circuit 2 is stopped and a malfunction of the load 3 can be prevented.

The mechanical relay 40 can be controlled on and off so that on/off operations of the contact 42 correspond to the aforementioned on/off operations of the switch 100. For example, it is possible to associate the on/off operations of the contact 42 with the control current I of the solid-state relay 1. It is also possible, as required, to control the mechanical relay 40 independently, or it is also possible to control the mechanical relay 40 on and off manually. If it is known in advance that the load control is not performed for a long period of time, turning off the mechanical relay 40 manually can prevent a malfunction during that period. Thereafter, when the load control is required again, the mechanical relay 40 can be turned on manually or automatically. Doing this way makes the control simpler.

As a mechanical relay is simple to control, it is not necessary to configure a complicated control circuit. Because of this reason, it is possible to realize a stable malfunction-free load control device easily. Furthermore, because a relay that has a make-and-break capability for turning on and off such a small current flowing through a snubber circuit is compact, said load control device can be configured at a lower cost.

Figure 5:
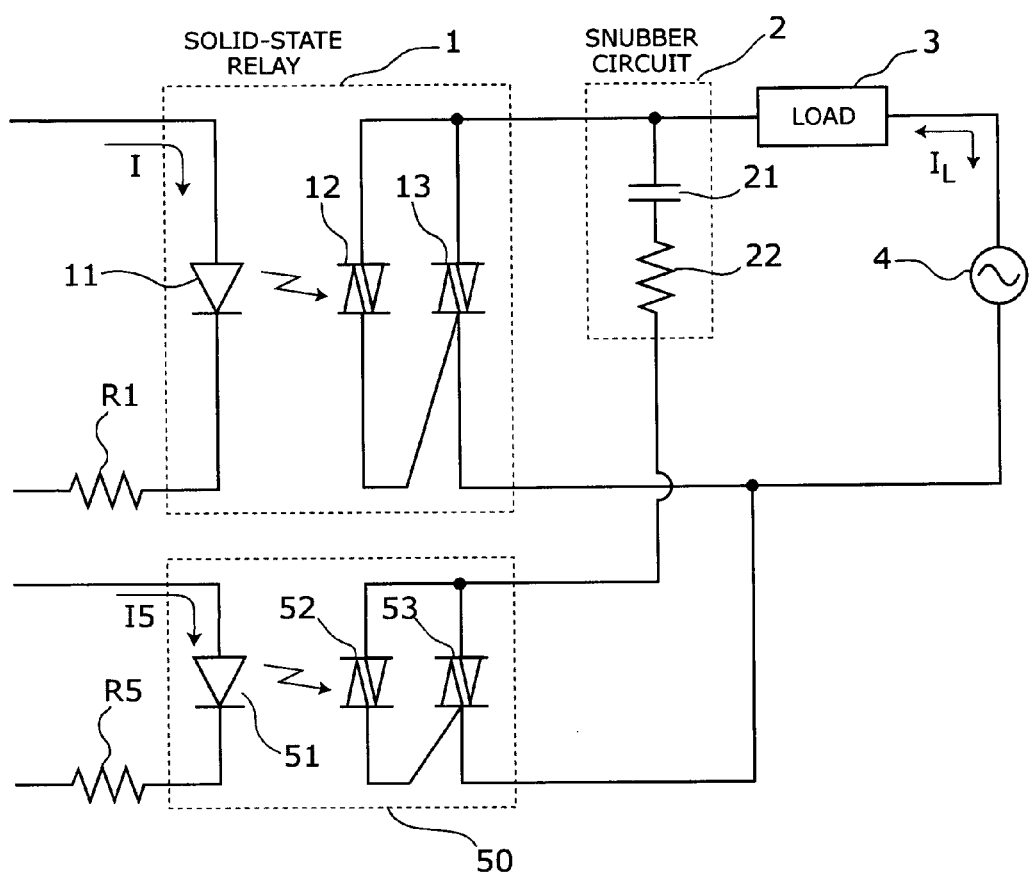
FIG. 5 is a circuit diagram embodying the invention and showing a solid-state relay used as the switch 100 shown in FIG. 1.

FIG. 5 is a circuit diagram embodying the invention and showing a solid-state relay used as the switch 100 shown in FIG. 1. In FIG. 5, reference numeral 50 represents a solid-state relay. The solid-state relay 50 comprises a light-emitting element 51 (this usually being a gallium arsenide LED or a gallium aluminum arsenide LED) for converting electrical signals to light signals, a light-receiving element 52 (this usually being a bi-directional photo-gate-controlled triode thyristor which is brought into conduction when light hits a gate thereof) for converting light signals to electrical signals, and a semiconductor switch 53 (this usually being a bi-directional gate-controlled triode thyristor). The semiconductor switch 53, as a switch to open and close the snubber circuit 2, is connected thereto in series, and a series circuit made up of the snubber circuit 2 and the semiconductor switch 53 is connected to the power control element 13 in parallel. When a control current I5 flows through the light-emitting element 51 and a current limiting resistor R5 connected thereto in series, the light-emitting element 51 emits light. Then, the light-receiving element 52 is brought into conduction, and current flows through a gate of the semiconductor switch 53 causing it to ignite. When the semiconductor switch 53 is in an ON state, the snubber circuit 2 becomes effective. When the semiconductor switch 53 is in an OFF state, current flowing through the snubber circuit 2 is stopped and a malfunction of the load 3 can be prevented.

The solid-state relay 50 can be controlled on and off so that on/off operations of the semiconductor switch 53 correspond to the aforementioned on/off operations of the switch 100. For example, it is possible to associate the on/off operations of the semiconductor switch 53 with the control current I of the solid-state relay 1. It is also possible, as required, to control the solid-state relay 50 independently, or it is also possible to control the solid-state relay 50 on and off manually. If it is known in advance that the load control is not performed for a long period of time, turning off the solid-state relay 50 manually can prevent a malfunction during that period. Thereafter, when the load control is required again, the solid-state relay 50 can be turned on manually or automatically. Doing this way makes the control simpler.

The solid-state relay 50 exhibits characteristics in that, once it changes to the ON state, it remains in the ON state until current flowing through a switching portion thereof becomes zero. Therefore, it is not necessary to keep the control current I5 of the solid-state relay 50 flowing continuously and, thus it is economical. The solid-state relay 50 does not generate an OFF surge. Because it is a contactless semiconductor switch, it has a longer life and can provide stable on/off operations for a long period of time. Moreover, because it has no mechanical part as found in a mechanical relay, the on/off operations can be performed at a high speed. Furthermore, because the solid-state relay 50, as well as a mechanical relay, is simple to control, configuring a complicated control circuit is not necessary and a stable malfunction-free load control device can be realized easily.

Figure 6:
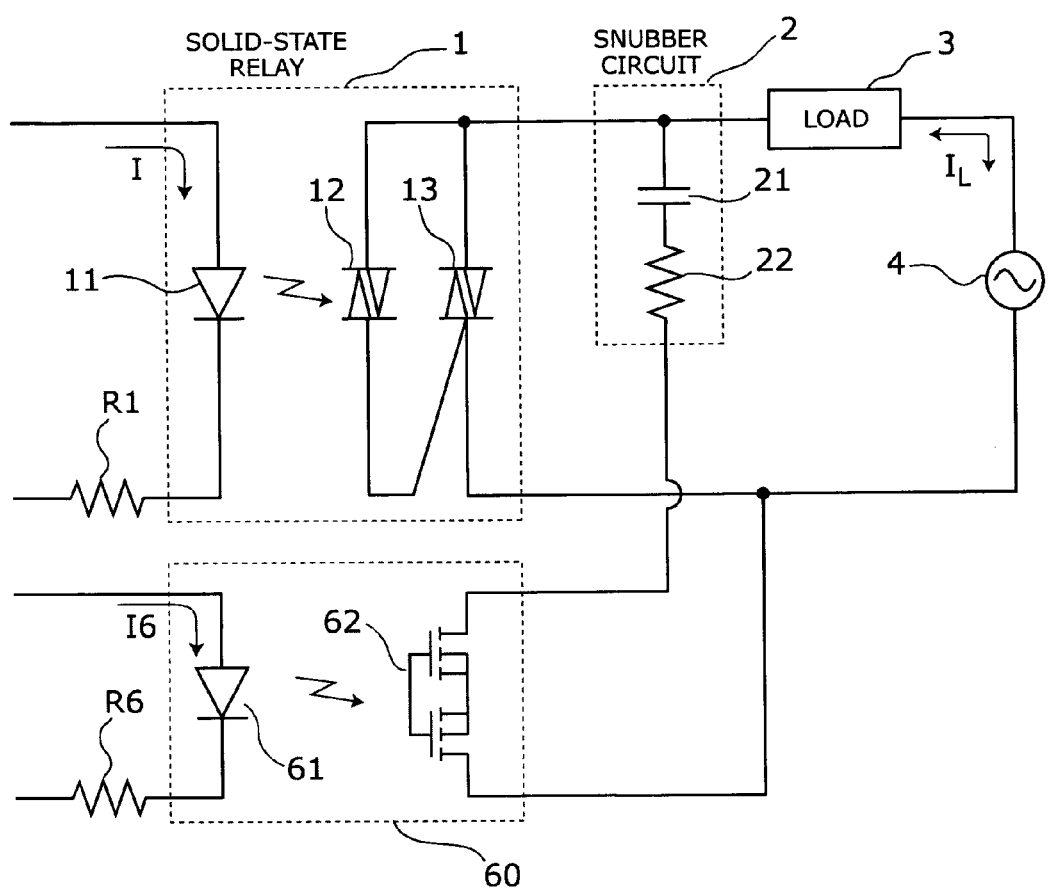
FIG. 6 is a circuit diagram embodying the invention and showing a photo-MOS transistor used as the switch 100 shown in FIG. 1.

FIG. 6 is a circuit diagram embodying the invention and showing a photo-MOS transistor used as the switch 100 shown in FIG. 1. In FIG. 6, reference numeral 60 represents a photo-MOS transistor that becomes conduction when light hits a gate thereof. The photo-MOS transistor 60 has, at an input side thereof, a light-emitting element 61 for converting electrical signals to light signals and, at an output side thereof, a MOS transistor 62 that exhibits a low impedance through a photoelectric effect. When a control current I6 flows through the light-emitting element 61 via a current limiting resistor R6 connected thereto in series, the light-emitting element 61 emits light and the MOS transistor 62 at the output side exhibits a low impedance. The MOS transistor 62 is connected to the snubber circuit 2 in series and a series circuit made up of the snubber circuit 2 and the MOS transistor 62 is connected to the power control element 13 in parallel. When the MOS transistor 62 is in an ON state, the snubber circuit 2 becomes effective. When the MOS transistor 62 is in an OFF state, current flowing through the snubber circuit 2 is stopped and a malfunction of the load 3 can be prevented.

The photo-MOS transistor 60 can be controlled on and off so that on/off operations of the MOS transistor 62 correspond to the aforementioned on/off operations of the switch 100. For example, it is possible to associate the on/off operations of the MOS transistor 62 with the control current I of the solid-state relay 1. It is also possible, as required, to control the photo-MOS transistor 60 independently, or it is also possible to control it on and off manually. If it is known in advance that the load control is not performed for a long period of time, turning off the photo-MOS transistor 60 manually can prevent a malfunction during that period. Thereafter, when the load control is required again, the photo-MOS transistor 60 can be turned on manually or automatically. Doing this way makes the control simpler.

Because an ON-resistance when the photo-MOS transistor 60 is brought into conduction is small, the snubber circuit 2 is connected through a low impedance path, the effect of the snubber circuit 2 is not impaired when the load is in operation, and an amount of heat generation is small as well. Furthermore, because it is a contactless semiconductor switch, it has a longer life and can provide stable on/off operations for a long period of time. Moreover, because it has no mechanical part as found in a mechanical relay, the on/off operations can be performed at a high speed. Furthermore, the photo-MOS transistor 60 is simple to control. As a result, configuring a complicated control circuit is not necessary and a stable malfunction-free load control device can be realized easily.

Figure 7:
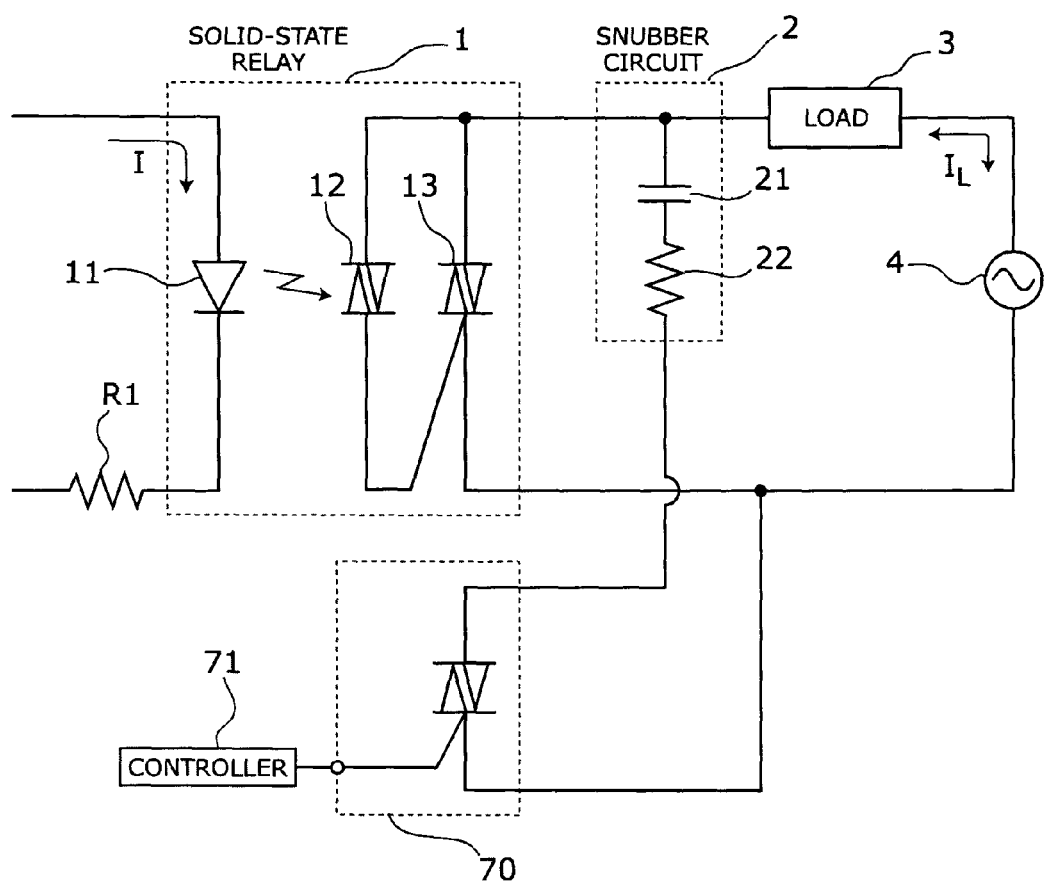
FIG. 7 is a circuit diagram embodying the invention and showing a bi-directional gate-controlled triode thyristor used as the switch 100 shown in FIG. 1.

FIG. 7 is a circuit diagram embodying the invention and showing a bi-directional gate-controlled triode thyristor used as the switch 100 shown in FIG. 1. In FIG. 7, reference numeral 70 represents a bi-directional gate-controlled triode thyristor connected to the snubber circuit 2 in series and a series circuit made up of the snubber circuit 2 and the bi-directional gate-controlled triode thyristor 70 is connected to the power control element 13 in parallel. Also, reference numeral 71 represents a controller connected externally for feeding a trigger current to a gate of the bi-directional gate-controlled triode thyristor 70. When the trigger current is fed in, the bi-directional gate-controlled triode thyristor 70 is turned on. When the bi-directional gate-controlled triode thyristor 70 is in an ON state, the snubber circuit 2 becomes effective. When the bi-directional gate-controlled triode thyristor 70 is in an OFF state, current flowing through the snubber circuit 2 is stopped and a malfunction of the load 3 can be prevented.

The bi-directional gate-controlled triode thyristor 70 can be controlled on and off so that on/off operations of the bi-directional gate-controlled triode thyristor 70 correspond to the aforementioned on/off operations of the switch 100. For example, it is possible to associate the on/off operations of the bi-directional gate-controlled triode thyristor 70 with the control current I of the solid-state relay 1. It is also possible, as required, to control the bi-directional gate-controlled triode thyristor 70 independently, or it is also possible to control it on and off manually. If it is known in advance that the load control is not performed for a long period of time, turning off the bi-directional gate-controlled triode thyristor 70 manually can prevent a malfunction during that period. Thereafter, when the control of the load is required again, the bi-directional gate-controlled triode thyristor 70 can be turned on manually or automatically. Doing this way makes the control simpler.

The bi-directional gate-controlled triode thyristor 70 is a typical element to be used as a semiconductor switch for alternating-current power. Therefore, it is possible to configure an alternating-current switch circuit at a lower cost. It also exhibits characteristics in that, once it changes to the ON state, it remains in the ON state until current flowing through a switching portion thereof becomes zero. Therefore, it is not necessary to keep the gate current flowing continuously and, thus it is economical. Furthermore, it does not generate an OFF surge. Because it is a semiconductor switch, it has a longer life and can provide stable on/off operations for a long period of time. Moreover, because it has no mechanical part as found in a mechanical relay, the on/off operations can be performed at a high speed.

Figure 8:
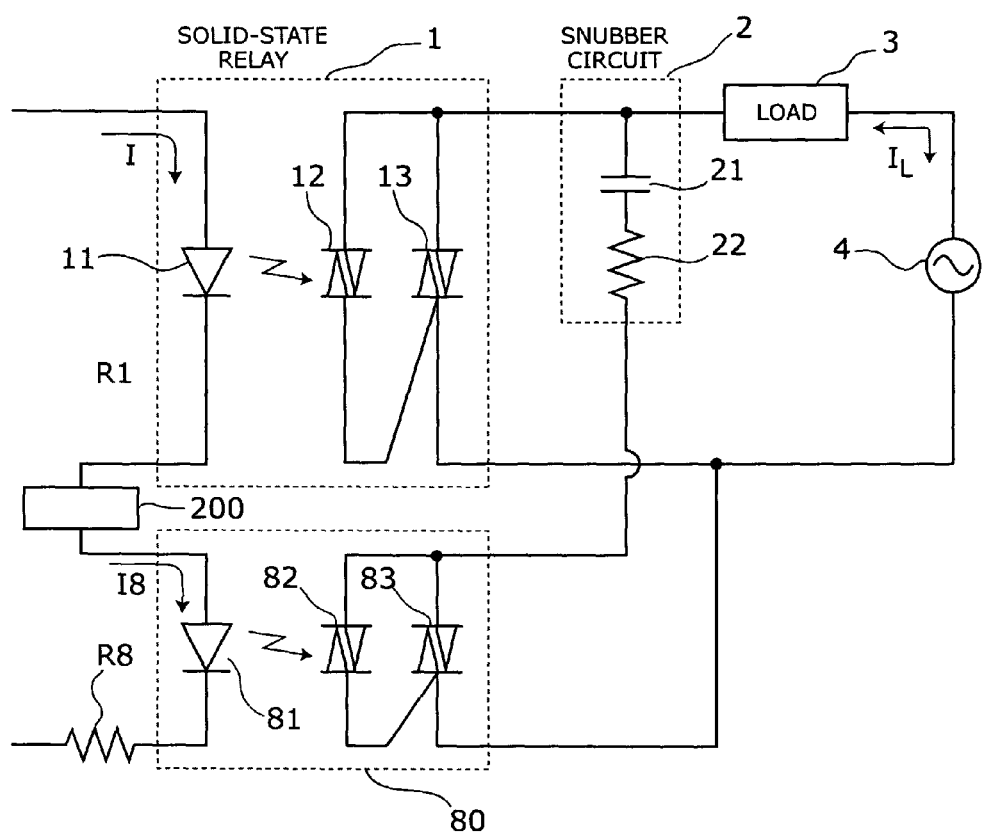
FIG. 8 is a circuit diagram embodying the invention and showing a delay circuit added to the load control device shown in FIG. 5 for delaying the OFF time of the control signal fed into the solid-state relay 1.

FIG. 8 is a circuit diagram embodying the invention and showing a delay circuit added to the load control device shown in FIG. 5 for delaying the OFF time of the control signal fed into the solid-state relay 1.

In FIG. 8, reference numeral 80 represents a solid-state relay having at an input side thereof a light-emitting element 81 (this usually being a gallium arsenide LED or a gallium aluminum arsenide LED) for converting electrical signals to light signals, at an output side thereof, a light-receiving element 82 (this usually being a bi-directional photo-gate-controlled triode thyristor which is brought into conduction when light hits a gate thereof) for converting light signals to electrical signals, and a semiconductor switch 83 (this usually being a bi-directional gate-controlled triode thyristor) having the light-receiving element 82 connected to a gate thereof. The semiconductor switch 83 is connected to the snubber circuit 2 in series as a switch to open and close the snubber circuit 2. A series circuit made up of the snubber circuit 2 and the semiconductor switch 83 is connected to the power control element 13 in parallel. When a control current I8 flows through the light-emitting element 81 and a current limiting resistor R8 connected thereto in series, the light-emitting element 81 emits light, causing the light-receiving element 82 to be brought into conduction and current to flow through a gate of the semiconductor switch 83 to ignite it. When the semiconductor switch 83 is in an ON state, the snubber circuit 2 becomes effective. When the semiconductor switch 83 is in an OFF state, the current flowing through the snubber circuit 2 is stopped and a malfunction of the load 3 can be prevented. In this circuit, a delay circuit 200 is connected between a cathode of the light-emitting element 11 and an anode of the light-emitting element 81. A current limiting resistor R8 is connected to a cathode of the light-emitting element 81 in series.

First, to operate the load 3, the control current I is fed in and the solid-state relay 1 is brought into conduction, and thereby, the load 3 is brought into conduction. These steps are identical with the steps as found in the conventional example. By contrast, a control current I8 that flows through the light-emitting element 81 located at an input side of the semiconductor switch 83 for opening and closing the snubber circuit 2, flows via the delay circuit 200 lagging behind the control current I. A delay time can be adjusted as necessary. Here, it is also possible to control the control current I8 to flow in synchronization with the control current I. The flow of the control current I8 brings the semiconductor switch 83 into conduction and makes the snubber circuit 2 effective.

Next, description will be made on stopping the operation of the load 3. To stop the load 3, the control current I flowing through the light-emitting element 11 should be stopped. Then, the power control element 13 turns off when current flowing therethrough becomes zero, which eventually stops the operation of the load 3. On the other hand, the control current I8 flowing through the light-emitting element 81 stops after having kept flowing for the adjusted delay time provided as a function of the delay circuit 200. The reason of this difference in timing is that, depending on types of the load, there is a time difference between the time when the control current I stops and the time when the power control element 13 turns off. This difference in time is also necessary, as explained as an effect of the conventional snubber circuit, to keep the snubber circuit 2 effective for a certain period of time after the power control element 13 has been turned off so as to avoid the commutation failure which may be caused immediately after the power control circuit 13 turns off.

When current flowing through the semiconductor switch 83 becomes zero after the control current I8 has stopped, the semiconductor switch 83 turns off and the current flowing through the snubber circuit 2 stops. As a result of this, the load 3 does not malfunction.

By associating the delay circuit 200 that delays an off-time of the solid-state relay 80 with the control signal of the solid-state relay 1, it is possible to eliminate a need for an additional controller for controlling switching off of the solid-state relay 80. Thus, it is possible to produce a stable malfunction-free load control device easily and reduce a production cost.

Although a solid-state relay is taken as an example as the switch 100 for describing the function of the delay circuit 200 shown in FIG. 8, similar functions can be achieved by using a mechanical relay, a solid-state relay, a photo-MOS transistor, or a gate-controlled triode thyristor as the switch 100.

Figure 9:
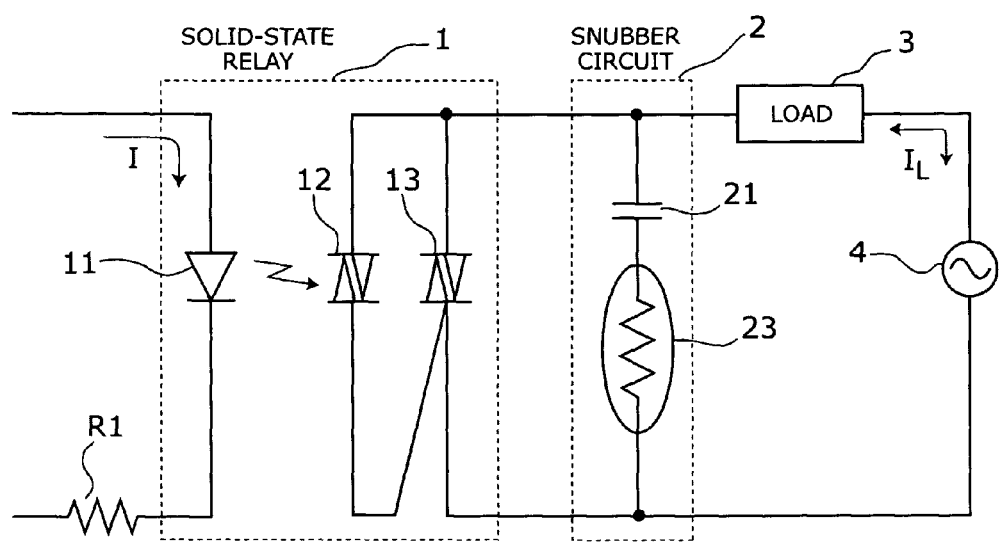
FIG. 9 is a circuit diagram embodying the invention and showing a circuit using a thermistor having a negative temperature coefficient as suppression means for suppressing current flowing through a snubber circuit.

FIG. 9 is a circuit diagram embodying the invention and showing a circuit using a thermistor having a negative temperature coefficient as suppression means for suppressing current flowing through a snubber circuit. In FIG. 9, reference numeral 1 represents a solid-state relay, reference numeral 2 represents a snubber circuit, reference numeral 3 represents a load, and reference numeral 4 represents an alternating-current power supply. Different from the conventional load control device as shown in FIG. 10 is that the resistor 22 forming the snubber circuit 2 shown in FIG. 10 is replaced with a thermistor 23 having a negative temperature coefficient as shown in FIG. 9.

When the thermistor 23 is provided in a position affected by an increasing temperature when the load 3 is in operation, such as in close proximity to the power control element 13, it is possible to prevent the load 3 from malfunctioning, because current flowing through the load 3 via the snubber circuit 2 becomes smaller due to a rise in a resistance value of the thermistor 23 when the load 3 is not in operation and low in temperature. On the other hand, when the load 3 is in operation, the resistance of the thermistor 23 decreases due to a rise in temperature of the power control element 13. As a result, the current flowing through the snubber circuit 2 increases in comparison with the current that flows when the load 3 is not in operation. Therefore, it is possible to avoid the commutation failure, because the high-frequency component removal efficiency during voltage fluctuation, which is a purpose to install the snubber circuit 2, is enhanced.

Because the temperature of the power control element 13 rises in accordance with the amount of the load current $I_L$, suppression of the current flowing through the snubber circuit 2 when the load 3 is not in operation is ensured by placing the thermistor 23 in close proximity to the power control element 13. Furthermore, the thermistor 23 and the power control element 13 can be combined into one piece. By doing so, it is possible to reduce a number of components forming the load control device and thereby reduce the cost thereof.

It is desirable to use the thermistor 23 as the resistor 22 which forms the snubber circuit 2 in the embodiment examples of the invention shown in FIGS. 1, 4, 5, 6, 7, and 8. To be more specific, it is desirable if means in which the switch 100 is used to shut off the current flowing through the snubber circuit 2 and means in which the snubber circuit 2 is composed of the thermistor 23 are combined as suppressing means for suppressing the current flowing through the snubber circuit 2 when the load 3 is not in operation. According to this configuration, the current flowing through the snubber circuit 2 when the load 3 is not in operation can be interrupted by the switch 100 so as to prevent the load 3 from malfunctioning as explained earlier. On the other hand, when the load control is performed and the switch 100 is tuned on, the temperature of the thermistor 23 rises to decrease the resistance thereof and the high-frequency component removal efficiency of the snubber circuit 2 against fluctuating voltage is enhanced, thereby making it possible to realize achieving a more stable load control.

As the suppressing means for suppressing the current flowing through the snubber circuit 2, examples using the switch 100 and the thermistor 23 were explained. However, the suppressing means can be any other type of means using such an element that can switch between a high-impedance state and a low-impedance state.

According to the present invention, as described before, the present invention provides the following advantages.

According to the present invention, it is possible to make a current flowing through a load via a snubber circuit smaller than a minimum operating current of the load and thereby prevent a light load operable with a smaller current from malfunctioning and realize achieving a stable load control.

Furthermore, according to the present invention, for such a load malfunctioning due to a voltage generated across the load by a flow of current through a snubber circuit when the load is not in operation, it is possible to reduce the voltage appearing across the load thereby prevent such a load from malfunctioning and thereby realize achieving a stable load control.

What is claimed is:

1. A load control device having a power control element connected in series to a series circuit of a load and an alternating power supply, and a snubber circuit comprising a series circuit of a resistor and a capacitor connected in parallel to the power control element, further comprising:
    suppressing means for suppressing current flowing through the snubber circuit to a value smaller than a minimum operating current of the load during a period when the power control element is turned off and when a power control of the load is in an operation state with the alternating power supply being applied thereto.

2. A load control device as claimed in claim 1, wherein the suppressing means is a switch connected in series to the resistor and the capacitor both of which constitute the snubber circuit.

3. A load control device as claimed in claim 2, wherein the switch is a mechanical relay.

4. A load control device as claimed in claim 2, wherein the switch is a solid-state relay.

5. A load control device as claimed in claim 2, wherein the switch is a photo-MOS transistor brought into conduction when light hits a gate thereof.

6. A load control device as claimed in claim 2, wherein the switch is a bi-directional gate-controlled triode thyristor.

7. A load control device as claimed in claim 1, wherein the suppressing means is a thermistor forming the snubber circuit and having a negative temperature coefficient.

8. A load control device as claimed in claim 7, wherein the thermistor is placed in close proximity to the power control element.

9. A load control device having a power control element connected in series to a series circuit of a load and an alternating power supply, and a snubber circuit comprising a series circuit of a resistor and a capacitor connected in parallel to the power control element, further comprising:
    suppressing means for suppressing current flowing through the snubber circuit during a predetermined period immediately following an end of a predetermined delay time which begins when the power control element shifts from an ON state to an OFF state.

10. A load control device as claimed in claim 9, wherein the suppressing means is a switch connected to the snubber circuit in series.

11. A load control device as claimed in claim 10, wherein the switch is a mechanical relay.

12. A load control device as claimed in claim 10, wherein the switch is a solid-state relay.

13. A load control device as claimed in claim 10, wherein the switch is a photo-MOS transistor brought into conduction when light hits a gate thereof.

14. A load control device as claimed in claim 10, wherein the switch is a bi-directional gate-controlled triode thyristor.

15. A load control device as claimed in claim 9, wherein the suppressing means is a thermistor forming the snubber circuit and having a negative temperature coefficient.

16. A load control device as claimed in claim 15, wherein the thermistor is placed in close proximity to the power control element.

17. A load control device as claimed in claim 10, wherein the load control device further comprising:
    a delay circuit for causing a signal for turning off the switch delayed from a signal for turning off the power control element.

* * * * *